H. A. MARTIN.
CREDIT ACCOUNT REGISTER.
APPLICATION FILED MAY 11, 1916.
1,307,591.
Patented June 24, 1919.
2 SHEETS—SHEET 1.
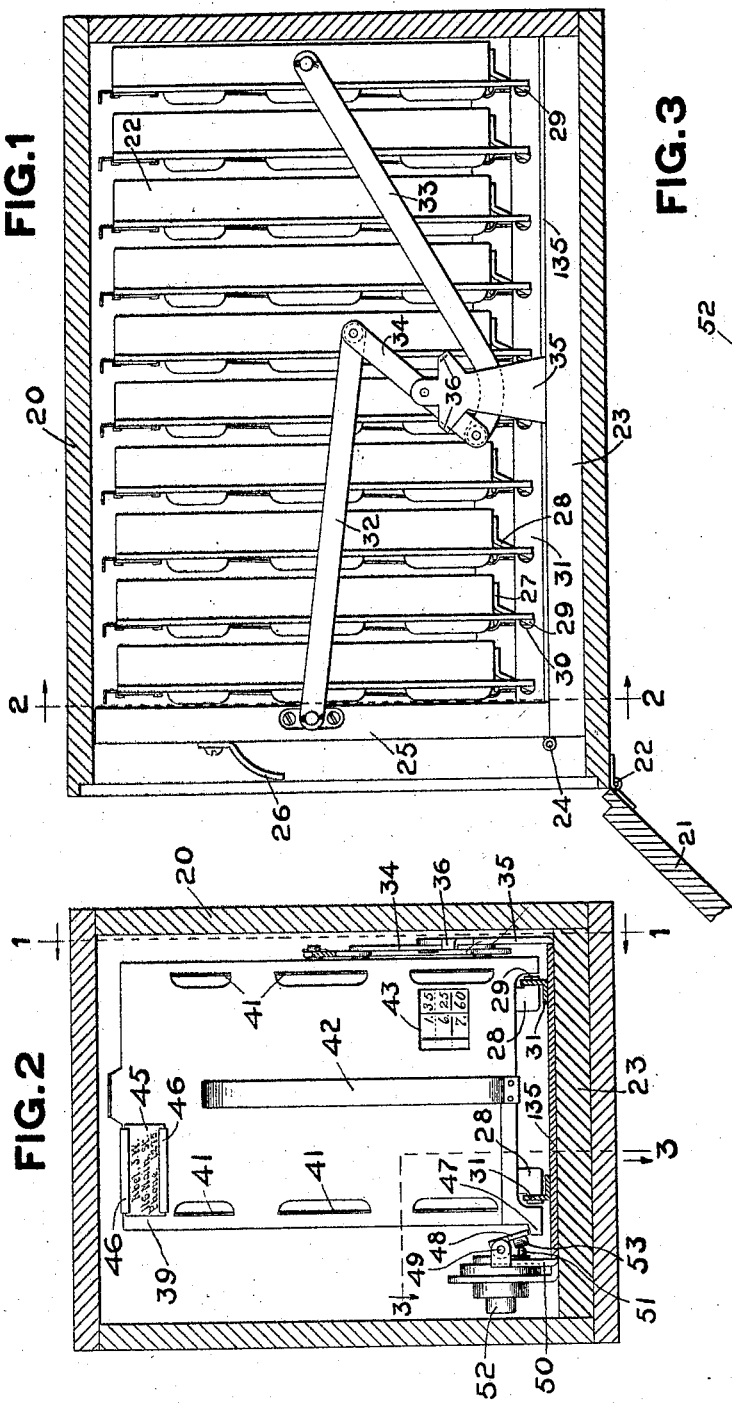
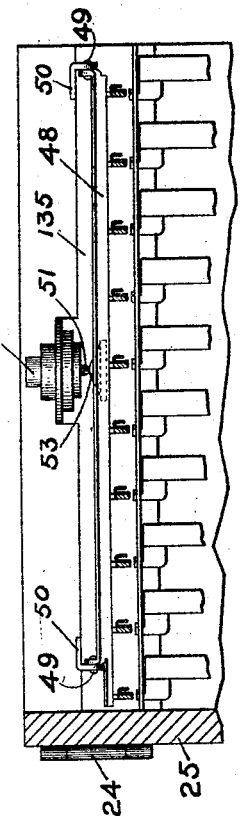
Inventor
HAAKON A. MARTIN
Attorneys

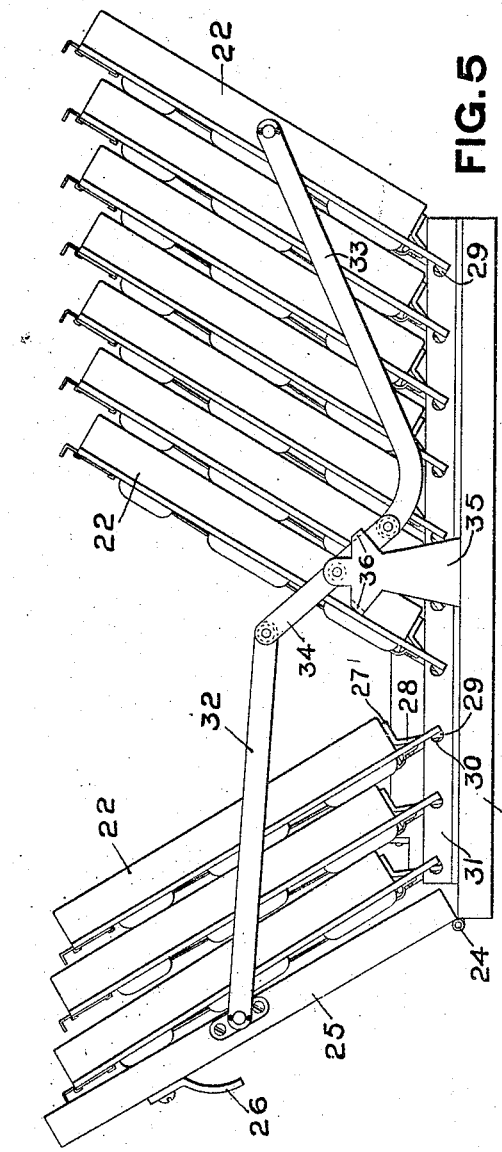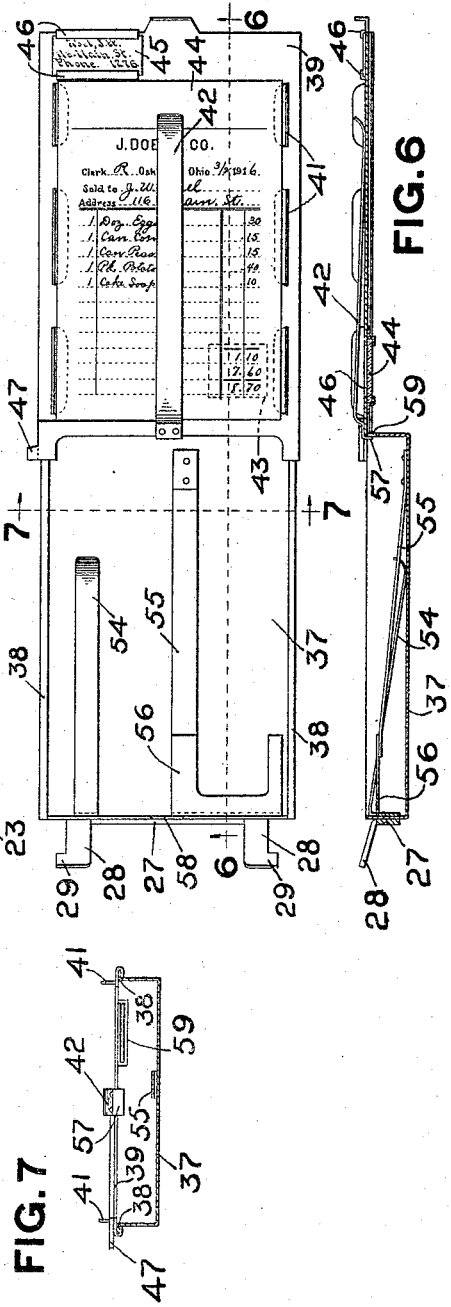

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

CREDIT-ACCOUNT REGISTER.

1,307,591.                    Specification of Letters Patent.    Patented June 24, 1919.

Application filed May 11, 1916.  Serial No. 96,761.

*To all whom it may concern:*

Be it known that I, HAAKON A. MARTIN, a citizen of the United States, residing at Dayton, in the county of Montgomery and State of Ohio, have invented certain new and useful Improvements in Credit-Account Registers, of which I declare the following to be a full, clear, and exact description.

The present invention relates to credit account registers and has more particular relation to that form of credit register which comprises a suitable filing cabinet or casing wherein sales slips or like data may be classified and filed.

The particular form of credit account register shown herein constitutes an improvement upon the form of filing cabinet shown in Letters Patent of the United States 1,134,248 issued to Edward J. Von Pein on April 6, 1915.

The invention is likewise an improvement upon an invention shown, described and claimed in a copending application of the present applicant, Serial No. 89,270 filed April 6, 1916. The subject matter common to said copending application and the present application is shown, described and claimed in said copending application, and reference to and a general description of the same will be made herein for the sake of illustration.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Figure 1 is a sectional view of the casing or cabinet taken on the line 1—1 of Fig. 2.

Fig. 2 is a front plan view taken in section of the filing cabinet on line 2—2 of Fig. 1.

Fig. 3 is a section taken approximately on the line 3—3 of Fig. 2.

Fig. 4 is a side plan view of a set of filing units withdrawn from the case.

Fig. 5 is a plan view of one of the filing units, the temporary filing section being slid upwardly to expose the permanent filing section.

Fig. 6 is a sectional view taken on the line 6—6 of Fig. 5.

Fig. 7 is a cross section taken on the line 7—7 of Fig. 5.

The credit account register illustrated herein comprises a suitable casing 20 formed substantially in the shape of a rectangular box and having at its forward side a lid or door 21 hinged at 22 to the lower part of the casing. The purpose of so mounting the door 21 is to permit of the same being swung down as shown in Fig. 1 so as to permit of the withdrawal of the filing units when reference is to be had to the same. The filing units 22 are pivotally mounted on a plate 135 fast on a base 23 slidably mounted in a lower portion of the casing. The base 23 has hinged at 24 at its forward end a front 25 provided with a drawer pull 26 to facilitate the drawing out of a set of filing units.

The base 23 may be provided with extension slides as shown in said Von Pein patent, but as such details do not constitute part of the present invention the same will not be shown or described herein. Such a device, however, may be used in the construction of the present account register without departing from the spirit of the present invention.

The filing units 22 carry at their lower ends, plates 27 (Figs. 5 and 6) having down turned legs 28 formed with pivot points 29 which are adapted to coöperate with holes 30 pierced in angle bars 31 fast on the plate 135 on the base 23. The front 25 and the rearmost filing unit 22 are pivotally connected to links 32 and 33 respectively (Fig. 4) which links both extend toward the center of the cabinet and are pivoted at their inner ends to opposite ends of a beam 34 pivoted near its center on the upper end of a standard 35 fast on the plate 135. The standard 35 is provided with two small flanges 36 which extend inwardly and coöperate with the pivoted beam 34 to limit the movements of the latter about its pivotal point. The purpose of the connecting links 32 and 33 and the beam 34 is to provide for clearance between the units to permit access to any one of the same as shown in Fig. 4.

When the drawer pull 26 is grasped and pulled forward it will readily be seen that as soon as the rearmost unit passes out of contact with the rear wall of the casing 20, the front 25 will rock on its hinge 24. This, through the medium of the link 32 will rock the beam 34 about its pivot and consequently rock the rearmost unit 22 in a clockwise direction about its pivot 29 as viewed in Figs. 1 and 4 so that the set of units will assume approximately the position shown in Fig. 4. In this manner sufficient space is provided between the filing units so as to permit access to the desired one of the same.

The units 22 each comprise a box section 37, preferably rectangular in shape and forming the main body of the units as shown in Figs. 5 and 6. The section 37 constitutes the permanent filing section hereinafter referred to and is provided with flanges 38 bent outwardly at right angles to its sides as shown in Figs. 5 and 7. The purpose of the flanges 38 is to provide slides for a temporary filing section. The temporary filing section comprises a plate 39 rolled rearwardly and inwardly at its sides to coöperate with the flanges 38 as shown in Fig. 7. In this way the plate 39 may be slid upwardly on the flanges 38 whenever access to the permanent filing section 37 is desired.

The plate 39 of the temporary filing section is provided with lugs 41 (Figs. 2 and 5) struck up from the plate 39 and forming a pocket in which sales slips 44 may be inserted. In order to hold the sales slips 44 in position between the lugs 41 a spring 42 is fast at its lower end to the lower end of the plate 39. As shown in Fig. 5 the sales slip 44 is adapted to receive certain entries such as the identity of the customer and clerk involved in the transaction and the totals of the sale for which the sales slip is filled out. At its lower right hand corner the sales slip is customarily provided with three spaces, to receive entries of the amount of the sale, the past account and the total to date.

In order that the slips which are filed in the permanent filing section may be readily viewed without sliding the temporary filing section to the position shown in Fig. 5, each of the temporary filing sections is provided with a sight opening 43 (Figs. 2 and 6) which opening is covered by a sheet of transparent material 44 through which the totals on the slips in the permanent filing section may be read as shown in Fig. 2.

As shown in Fig. 2 the permanent filing section contains a slip which indicates that the total of the account to date is $7.60. When a new sale is made as indicated cash sales slip 44 in Fig. 5, the sales slip is made out to contain all the items of the transaction. The clerk making the sale then refers to the proper filing unit assigned to the customer making the purchase and by looking through the sight opening 43 he observes that the total to date is $7.60. This amount is entered on the new sales slip as shown in Fig. 5. The clerk then computes the new total to date which is $8.70 and then inserts the slip in the temporary filing unit. In this position the sales slip 44 which is inserted will cover the sight opening 43 as shown in Fig. 5 and thus conceal the portion of the uppermost sales slip in the permanent filing section which was open to view. The advantage of so covering the sight opening 43 is that when a second slip is made out the same day the total to date will be taken from the sales slip in the temporary filing section and not read through the sight opening as might be done in case the slips in the permanent section were still visible. This, as will readily be seen, will avoid confusion and error.

The temporary filing section of each unit carries a suitable identifying label 45 (Figs. 2, 5 and 6) which is held in the position on the temporary filing section as shown in said figures by lips 46 struck from the body of the plate from which the temporary filing section is formed. In this way each of the filing units 22 is assigned to the account of some particular customer and the label constitutes a means for identifying the account to which the particular unit is assigned.

At the end of the day it is proposed that all of the slips 44 which have been filed in the temporary filing sections of the units will be transferred by the proprietor or manager of the store to the permanent filing section 37 of the filing unit. Access to the permanent filing section, however, is normally prevented, means being provided to prevent the sliding of the temporary filing section out of normal position to the position shown in Figs. 5 and 6. The means for preventing access to the permanent filing section comprises the following mechanism.

Each of the temporary filing sections of the units is provided at its lower left hand corner as viewed in Fig. 2 with a lug 47, which, when the temporary filing section is in the position shown in Fig. 2, is in axial alinement with the pivotal points 29. At all times when the filing device is in general use any vertical movement of the temporary filing section relative to the permanent filing section is prevented by a pivoted wing or plate 48 pivoted at each end at 49 to a pair of standards 50 struck up from the base plate 135. The plate 48 is normally held in the position shown in Fig. 2 by the engagement of a pin 51 carried by the barrel of a key controlled lock 52 with a lug 53 carried by said plate 48. When the pin 51 is in the position shown in Fig. 2 it will bear against the thickest portion of the lug 53 and thus hold the plate 48 in locking position. When, however, the set of filing units is drawn outwardly from the cabinet and the proprietor or manager carrying a key for the lock 52 desires to have access to the permanent filing sections, he may insert his key in the lock 52 and by turning the barrel of said lock the pin 51 will be withdrawn from engagement with lug 53, thereby permitting the plate 48 to assume a position out of the path of movement of the lug 47. In this manner all of the temporary filing sections will be unlocked and access may be had to any of the permanent filing sections of the units. The unlocking the temporary filing sections is usually at the time the proprietor or manger audits the account at the end of any period, such as each evening at which time the sales slips appearing in the temporary filing sections are to be transferred to the permanent filing sections. By running over all of the units 22 in the filing cabinet the proprietor may at once ascertain which accounts were handled during the day and he is at once able to determine which of the credit customers have made purchases during the day as well as the amounts of their purchases. In order to audit the sales slips it is possible for the proprietor merely to draw the sales slip up slightly under the spring 42 to uncover the opening 43 and observe through the opening the past total which was to be transferred to the new charge slip. In this way he is able to check the clerks by noting whether or not the proper total was carried forward. Upon finding out that the proper total was carried forward and the account is properly audited the proprietor or manager will then slide the temporary filing section upward relative to the permanent filing section, thereby permitting access to the latter. The sales slip or slips in the temporary filing section may then be withdrawn from under the spring 42 and placed on top of any sales slips which may already be on file in the permanent filing section.

When the sales slips are placed in the permanent filing section they are placed back of a spring 54 and in front of a spring 55 (Figs. 5 and 6). The purpose of the spring 54 is to hold the sales slips inserted in the permanent filing section in proper position to prevent their falling out as the temporary filing section is raised. The function of the spring 55 is to press the lower right hand corners of the sales slips in the permanent filing section outward against a U-shaped guard 56 fast on the lower end of the permanent filing unit. The purpose of so pressing the lower right hand corners of the sales slips outwardly is to hold the corners of the sales slips bearing the totals as close as possible to the sight opening 43 in the temporary filing section so as to facilitate the reading of the totals on the top slip.

In order to limit the sliding movement of the temporary filing section to prevent its being detached from the permanent filing section the lower end of spring 42 is turned inwardly as shown at 57 in Fig. 6. The end of the spring so turned in, will when the temporary filing section is drawn out to the position shown in Fig. 6, engage the upper wall of the permanent filing section, thereby limiting the sliding movement. When the temporary filing section is restored to normal position it passes beneath the plane of the lower wall of the permanent filing section, being permitted to pass that wall by reason of a small opening 58 cut in said lower wall.

The upper wall of the permanent filing section is also cut away as shown at 59 to provide clearance for the transparent plate 44 over the sight opening 43.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. The combination with a filing unit comprising two sections so arranged that one section normally prevents access to the other, the said sections slidably connected whereby the former section may be moved to permit access to the latter, of means for normally preventing relative movement between the said sections.

2. The combination with a filing unit comprising two sections so arranged that one section normally prevents access to the other, said sections slidably connected to each other whereby one section may be moved to permit access to the other, of means for normally preventing relative movement between said sections and means for rendering said first mentioned means ineffective.

3. The combination with a filing unit comprising two sections so arranged that one section normally prevents access to the other, said sections slidably connected to each other whereby relative movement may be had between them for permitting access to both, of latching means for normally preventing said relative movement of said sections.

4. In a filing device the combination with a plurality of filing units each comprising two sections slidably connected to each other to permit of relative movement, of latching means common to all of said units normally preventing relative movement of the sections thereof and means for disabling said latching means at will.

5. In a filing device the combination of a suitable casing, of a base slidably mounted therein, a series of filing units pivotally mounted on said base each unit comprising two sections slidably connected to each other to permit of relative movement of the sections, latching means common to all of said units and also carried by said base for normally preventing relative movement of the sections thereof and means for disabling said latching means at will.

6. A filing unit comprising two sections, a temporary section and a permanent section said sections being slidably connected to permit relative movement of the sections, said sections being normally in such relative position that the temporary section renders the permanent section inaccessible, a sight opening in the temporary section through which the contents of the permanent section may be viewed, a spring in each section to hold the contents thereof in position, and a second spring in the permanent section for holding the contents thereof close to the sight opening in the temporary section to facilitate viewing said contents.

7. The combination with a filing unit comprising two sections so arranged that one of said sections normally prevents access to the other, said sections slidably connected to each other whereby relative movement may be had between them for permitting access to both of the sections, of latching means for normally preventing said relative movement of said sections and means for disabling said latching means at will.

8. The combination with a filing unit comprising two sections so arranged that one of said sections normally prevents access to the other, said sections slidably mounted on each other whereby relative movement may be had between them for permitting access to both sections, of latching means for normally preventing said relative movement of said sections and key operated means for disabling said latching means at will.

9. The combination with a filing unit suitably pivoted to permit swinging movement on a base and comprising two sections so arranged that one section normally prevents access to the other, said sections slidably mounted on each other whereby relative movement may be had between them for permitting access to both sections, of means for normally preventing said relative movement of said sections whereby one of said sections is rendered inaccessible.

10. A filing device comprising a base, a plurality of filing units suitably pivoted to said base to permit swinging movement, each of said units comprising two sections so arranged that one section normally prevents access to the other, the said sections slidably connected whereby the former section may be moved to permit access to the latter section, and means for normally preventing the sliding of one section on the other, whereby one of said sections is normally inaccessible.

11. A filing device comprising a plurality of filing units each comprising two sections so arranged that one section normally prevents access to the other, said sections slidably connected to each other to permit relative movement between them and thereby allow access to both sections, latching means common to all of said units normally preventing relative movement between the sections thereof, and means for disabling said latching means at will.

12. A filing device comprising a plurality of filing units each comprising two sections so arranged that one section normally prevents access to the other, said sections slidably connected to each other to permit relative movement between them and thereby allow access to both sections, latching means common to all of said units normally preventing relative movement between the sections thereof, and key operated means for disabling said latching means at will.

13. In a filing device, the combination with a suitable casing, of a base slidably mounted therein, a series of filing units pivotally mounted on the base, each unit comprising two sections slidably connected to each other to permit relative movement between the sections of each unit.

14. In a filing device, the combination with a suitable casing, of a base slidably mounted therein, a series of filing units pivotally mounted on said base, each unit comprising two sections slidably connected to each other to permit relative movement of the sections, means common to all of said units for normally preventing relative movement between the sections thereof and means for disabling said first mentioned means at will.

15. In a filing device, the combination with a suitable casing, of a base slidably mounted therein, a series of filing units pivotally mounted on said base, each unit comprising two sections slidably connected to each other to permit relative movement between them, latching means common to all of said units for normally preventing said relative movement between the sections thereof, and key operated means for disabling said latching means at will.

16. A filing unit comprising a temporary section and a permanent section, said sections being arranged whereby one section normally prevents access to the other, said sections slidably connected to each other to permit relative movement between them and thereby allow access to both sections, a sight opening in the temporary section through which the contents of the permanent section may be viewed, a spring in each section to hold the contents thereof in position, and a second spring in the permanent section for holding the contents thereof close to the sight opening in the temporary section to facilitate viewing said contents.

17. A filing unit comprising a temporary section and a permanent section, said sections being arranged whereby one section normally prevents access to the other, said sections slidably connected to each other to permit relative movement between them and thereby allow access to both sections, a sight opening in the temporary section and a spring in the permanent section for holding the contents thereof close to the sight opening in the temporary section to facilitate viewing said contents.

18. In a filing device comprising a base, a filing unit suitably pivoted to said base to permit swinging movement, said filing unit comprising a permanent section and a temporary section, each of said sections being slidably mounted on the other to permit relative movement between the two, of latching means normally preventing sliding movement between the said sections, said latching means arranged whereby when in latching position it will permit movement of the unit on its pivot.

19. A filing device comprising a base, a plurality of filing units suitably pivoted to said base to permit swinging movement, each of said units comprising a permanent section and a temporary section, said sections so arranged that the temporary section prevents access to the permanent section, said temporary section slidably mounted on said permanent section, latching means for normally preventing the sliding of said temporary section whereby the permanent section is normally inaccessible, said latching means when in latching position permitting the movement of the unit on its pivot.

In testimony whereof I affix my signature.

HAAKON A. MARTIN.

Copies of this patent may be obtained for five cents each, by addressing the "Commissioner of Patents, Washington, D. C."